United States Patent [19]
Woodward

[11] Patent Number: 5,540,104
[45] Date of Patent: Jul. 30, 1996

[54] ACOUSTIC DISPLACEMENT FLOW METER

[75] Inventor: W. Stephen Woodward, Chapel Hill, N.C.

[73] Assignee: J&W Scientific Incorporated, Folsom, Calif.

[21] Appl. No.: 418,741

[22] Filed: Jun. 12, 1995

Related U.S. Application Data

[62] Division of Ser. No. 171,868, Dec. 22, 1993, which is a continuation of Ser. No. 827,176, Jan. 28, 1992, abandoned.

[51] Int. Cl.$^6$ ........................................ G01F 1/20
[52] U.S. Cl. ........................... 73/861.18; 73/861.21; 73/203; 137/487.5; 137/557
[58] Field of Search ................. 73/202, 203, 861.18, 73/861.21, 861, 861.23, 861.43, 861.46; 137/487.5, 557

[56] References Cited

U.S. PATENT DOCUMENTS

| | | |
|---|---|---|
| 4,285,245 | 8/1981 | Kennedy . |
| 4,364,413 | 12/1982 | Bersin et al. . |
| 4,373,549 | 2/1983 | Nalepa et al. . |
| 4,550,615 | 11/1985 | Grant . |
| 4,879,907 | 11/1989 | Patterson et al. . |

FOREIGN PATENT DOCUMENTS

| | | |
|---|---|---|
| 2747738 | 10/1977 | Germany . |
| WO81/02629 | 2/1981 | WIPO . |

OTHER PUBLICATIONS

Research Disclosure, vol. 64, No. 183, Jul. 1979, p. 398.

*Primary Examiner*—Stephen Chin
*Assistant Examiner*—Timothy J. May
*Attorney, Agent, or Firm*—Graham & James LLP

[57] ABSTRACT

An acoustic displacement flowmeter uses a high-compliance acoustic-type displacement transducer to measure fluid flow accumulated by temporarily restricting the flow of a fluid along a path. The displacement transducer signal, representative of fluid flow rate, is integrated after an initial settling period elapses, and the integrated signal is periodically sampled. The number of samples taken during a measurement cycle depends upon the slope of the integrated signal and the maximum sample period permitted. The samples are summed and the actual flow rate is computed by a microcomputer.

10 Claims, 4 Drawing Sheets

| FIG. 3A. | FIG. 3B. |

ACOUSTIC DISPLACEMENT FLOW METER

This is a division of application Ser. No. 08/171,868 filed Dec. 22, 1993, which is a file wrapper continuation of U.S. Ser. No. 07/827,176 filed Jan. 28, 1992, now abandoned.

BACKGROUND OF THE INVENTION

This invention relates to fluid flow measuring devices. More specifically, this invention relates to fluid flow measuring devices for providing electrical signals representative of fluid flow.

Many techniques exist in the prior art for the electronic measurement of fluid flow. Typically, such techniques require prior knowledge of the physical properties of the fluid to be measured so that the measuring instrument can be calibrated. Typical examples of such physical parameters are the specific heat capacity, compressibility, density, viscosity, and thermal conductivity of the fluid. Many of these physical parameters are themselves dependent upon the composition of the fluid. For applications in which the fluid composition is unknown or variable in an unpredictable way, such techniques are both inaccurate and unsuitable.

Additional disadvantages inherent in many prior art techniques include limitations in the range of flow rates over which accurate measurements can be reliably made, some times termed the "turn-down ratio"; and the generation of unacceptable back pressure in the fluid path when the flowmeter is connected and operational.

In an attempt to overcome the above-noted shortcomings of the prior art, flowmeters has been developed which are less sensitive to fluid physical parameters. This class of flowmeter is generally termed a positive displacement type flowmeter. In a positive displacement flowmeter, the fluid whose flow is to be measured is periodically accumulated in a separate confining chamber, such as a cylinder with a tight fitting piston, whose volume increases at a rate equal to the flow of the fluid (e.g., by displacement of the piston). By measuring the rate of increase of the confined volume (e.g., by generating a signal representative of the amount of displacement of the piston), the fluid flow rate may be computed. While specific flowmeter details (such as the manner of defining the confined volume and the technique for transducing the rate of volume change) differ depending on the style and application of a given positive displacement flowmeter, all such flowmeters possess the desirable property of reasonable accuracy in the fluid flow measurement independent of the physical parameters of the fluid being measured. However, a severe disadvantage in known positive displacement flowmeters comprises the disturbance in the fluid flow caused by the necessity of displacing the movable surface of the confining chamber in order to generate the measurement signal. This introduces back pressure characteristics which render such flow meters unsuitable for use in any application sensitive to the periodic introduction of fluid flow back pressure.

One positive displacement type gas flowmeter which has been developed to reduce the adverse back pressure effect is the soap-film type of positive displacement flowmeter. In this type of flowmeter, the confined volume is defined by a smooth-walled cylindrical tube typically fabricated from transparent glass. The tube has an inlet end connected to the gas whose flow is to be measured and an outlet end open to ambient. Adjacent the inlet end is an arrangement for introducing a soap film to be swept along the inner volume of the tube by the advancing gas flow. Optical sensors arranged at predetermined locations along the tube measure the transit time of the soap film translated along the interior of the tube, and this time value is converted to a fluid flow rate using a known algorithm. Due to the fact that only the relative small forces of viscosity and the surface tension effects oppose the motion of the soap film and thus the flow of the gas stream, the back pressures generated by this type of flowmeter are generally sufficiently low to be acceptable. In addition, the soap film flowmeter has a dynamic measurement range which is substantially broader than that of positive displacement flowmeters (typically in the range from about 0.5 to about 500 Ml/min.). Also, this type of flowmeter is relatively inexpensive to manufacture and maintain. The major disadvantage of the soap film flowmeter is the requirement that soap film must be periodically generated, introduced into the fluid stream and some how exhausted. Generation of the soap film is typically performed by means of a manually operated bubble generating device, which requires the presence of a human operator and prevents automatic or unattended operation. Also, due to the fact that the wet film is introduced into the gas stream, the stream is contaminated with water vapor, which is unsuited for many in-line applications involving gasses. In addition, the soap film type flowmeter is entirely unsuited for any flowmeter applications involving liquids.

SUMMARY OF THE INVENTION

The invention comprises a positive displacement type flowmeter which requires no advance knowledge of the physical parameters of the fluid, which introduces no substantial back pressure in the fluid flow path, which introduces no contamination in the fluid path, possesses a wide dynamic range of measurable flow rates, which is compatible with a wide variety of gas and liquid fluid flow applications, and is capable of fully automatic operation.

From an apparatus standpoint, the invention comprises a displacement transducer having a fluid port adapted to be coupled to a fluid path, a displacement element, and a signal output for manifesting a signal representative of movement of the displacement element due to the ingress of fluid through the port; and means having an input coupled to the displacement transducer signal output for computing the average value of the fluid flow rate over a measurement period. The computing means includes means for generating a control signal for enabling a controllable valve located in the fluid path to divert fluid into the transducer fluid port, means responsive to the generation of the control signal for masking an initial portion of the transducer output signal, means for integrating the transducer output signal after the initial portion, means for sampling the values of the integrating means, means for summing the sample values, and means for terminating the control signal when one of the following conditions occurs: (a) the magnitude of the sample value reaches a predetermined maximum value; or (b) the measurement period reaches a predetermined maximum value. The computing means preferably includes means for determining the value of the fluid flow rate from the equation:

$$F=2S/[bn(n+1)]$$

where F is the determined flow rate, S is the value of the summed samples, n is the number of samples obtained, and b is a predetermined calibration constant. The masking means preferably includes means for determining the length T of the initial portion to be masked using the algorithm:

if f is ≧K, then T=0 if f is <K, then $T=[(K-f)/AK]$, where f is the fluid flow rate determined from a previous measurement, K is a preselected constant flow rate value lying within the desired range of values to be measured, and A is a preselected fraction.

The computing means also optionally includes a manually operable switch for initiating a measurement cycle, a timer for terminating operation of the flowmeter after the lapse of a predetermined time period, and means for extending operation of the flowmeter whenever a sampling means indicates that the manually operable switch means was activated before the lapse of the predetermined time period.

From a method standpoint, the method comprises the steps of establishing fluid flow along a fluid path, directing the flow of the fluid to a transducer having a displacement element by restricting the flow path, generating a signal from the transducer representative of displacement due to fluid flow while the path is restricted, using the transducer signal to determine the fluid flow rate, and reestablishing fluid flow along the path by removing the restriction. The step of establishing fluid flow along the path preferably includes the step of providing a controllable valve in the path; and the step of directing the flow of the fluid to a transducer preferably includes the step of operating the valve to provide the temporary flow path restriction.

The step of generating a signal from the transducer preferably includes the step of allowing the diverted fluid to displace the transducing element for a period of time dependent upon the magnitude of the signal.

The step of reestablishing the fluid flow along the path preferably includes the steps of commencing a measurement period in response to the step of directing the flow to the transducer, monitoring the magnitude of the fluid flow rate signal, and commencing removal of the restriction when one of the following conditions occurs: (a) the magnitude of the flow rate signal reaches a predetermined maximum value; or (b) the measurement period reaches a predetermined maximum value.

The step of generating a signal from the transducer preferably includes the step of ignoring an initial portion of the transducer signal representative of a transient condition, the initial portion being determined from a previous determined fluid flow rate. In a specific embodiment, the initial portion is determined in accordance with the algorithm:

if f is ≧K, then T=0 if f is <K, then $T=[(K-f)/AK]$, where f is the fluid flow rate determined from a previous measurement, K is a preselected constant flow rate value lying within the desired range of values to be measured, T is the time value of the initial portion and A is a preselected fraction.

The step of using the transducer signal to determine the fluid flow rate preferably includes the steps of integrating the signal over a measurement period, sampling the value of the integrated signal, summing the sample values, and determining the flow rate from the equation:

$F=2S/[bn(n+1)]$ where F is the determined flow rate, S is the value of the summed samples, n is the number of samples obtained, and b is a predetermined calibration constant.

In another method aspect, the invention comprises a method of using a displacement transducer signal representative of flow of a fluid to determine the fluid flow rate, the method including the steps of masking an initial portion of the transducer signal for a time period, integrating the transducer signal over a measurement period, sampling the value of the integrated signal, summing the sampled value, and determining the fluid flow rate from the equation:

$F=2S/[bn(n+1)]$ where F is the determined flow rate, S is the value of the summed samples, n is the number of samples obtained, and b is a predetermined calibration constant. The initial portion time period is determined from a previous determined fluid flow rate, preferably in accordance with the algorithm:

if f is ≧K, then T=0 if f is <K, then $T=[(K-f)/AK]$, where f is the fluid flow rate determined from a previous measurement, K is a preselected constant flow rate value lying within the desired range of values to be measured, T is the time value of the initial portion and A is a preselected fraction.

For a fuller understanding of the nature and advantages of the invention, reference should be had to the ensuing detailed description, taken in conjunction with the accompanying drawings.

DESCRIPTION OF THE PREFERRED EMBODIMENT

Figure 1:
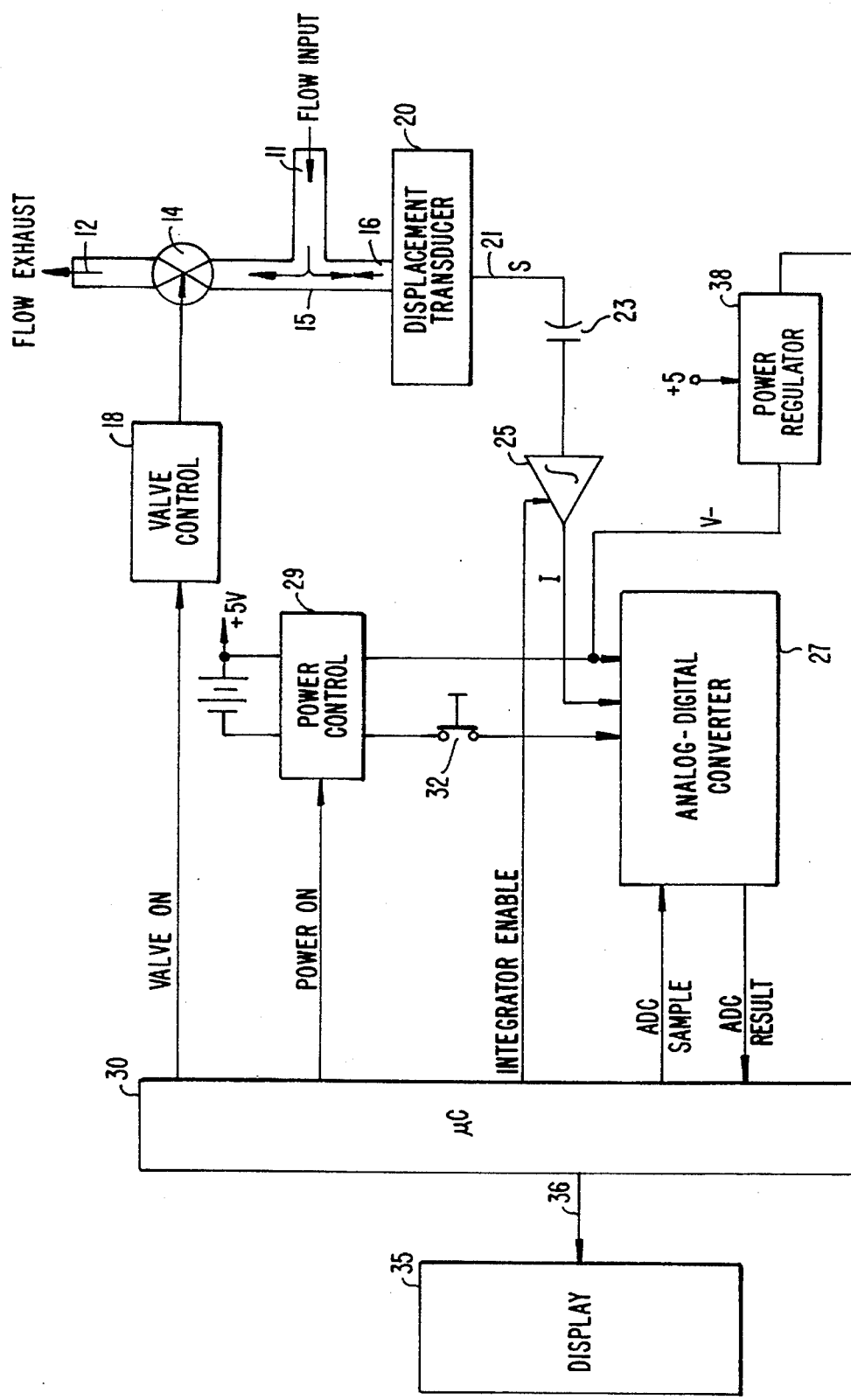
FIG. 1 is a schematic block diagram illustrating the preferred embodiment of the invention.

Turning now to the drawings, FIG. 1 is a schematic block diagram illustrating the major units comprising the preferred embodiment of the invention. As seen in this Figure, a portion of a fluid flow path includes an inlet 11 into which a fluid, either a gas or liquid, is introduced and a flow outlet 12 which is coupled to the downstream portion of the fluid flow path. An electrically operable flow restricting valve 14 is positioned upstream of the outlet 12 and downstream of the inlet 11. The portion of the fluid flow path between inlet 11 and valve 14 is branched at 15, and the lower portion 16 is coupled to the inlet port of a displacement transducer 20.

Flow restriction valve 14 is preferably a normally opened valve such as a type C42533 valve available from Edmund Scientific Co. This valve is controlled by a valve control unit 18 which receives a control signal termed VALVE ON from a microcomputer unit 30. Valve 14 is operated to the closed state by valve control unit 18 whenever the VALVE ON signal, depicted in FIG. 2, is in the active state illustrated.

Figure 2:
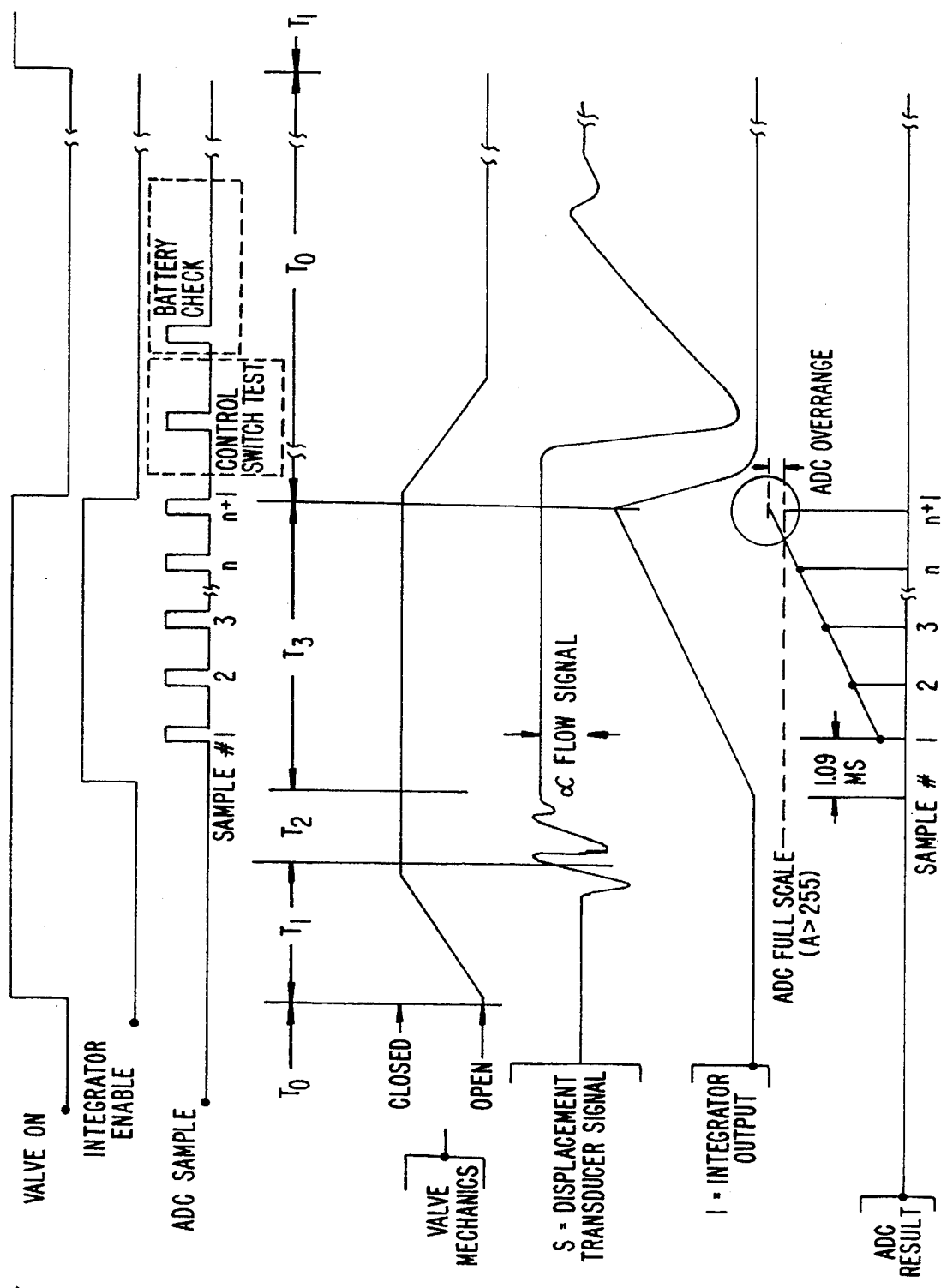
FIG. 2 is a timing diagram illustrating the operation of the embodiment of FIG. 1.

Displacement transducer 20, which preferably comprises a high-compliance acoustic-type displacement transducer, such as a type 255P223 transducer available from Mouser Electronics Co., generates an electrical signal termed signal S in FIG. 2 on a signal output line 21. The displacement transducer output signal on output conductor 21 is ac coupled via a capacitor 23 to the signal input of a gated integrated unit 25. Gated integrated unit 25 is controlled by an integrator enable signal from microcomputer 30 which is generally a fixed time period after the commencement of the VALVE ON enable signal. The purpose for this delay between the two signals is to provide a settling time for masking the initial transient signals present on displacement transducer output signal line 21. The output of the gated integrator 25 is coupled to the signal input of an analog to digital converter 27, which is also illustrated in detail in FIG. 3.

Analog to digital converter 27 has a sample control signal input which controls the sample rate, the sampling signal being supplied by the microcomputer 30. The digital samples periodically output from converter 27 are supplied to a dedicated input port of the microcomputer 30.

Power to the analog to digital converter 27 is controlled by a power control unit 29 which receives a power on control signal from the microcomputer 30, and which includes a manual operable switch 32 which enables manual control of the start of the measurement operation.

Microcomputer 30 has an output port coupled to a display unit 35 via connections 36 to permit visible display of the computational results and the status of the system. In the preferred embodiment, microcomputer 30 uses a type Z84C004 microcomputer available from Zilog Inc., with the configuration illustrated in FIG. 3.

Figure 3A:
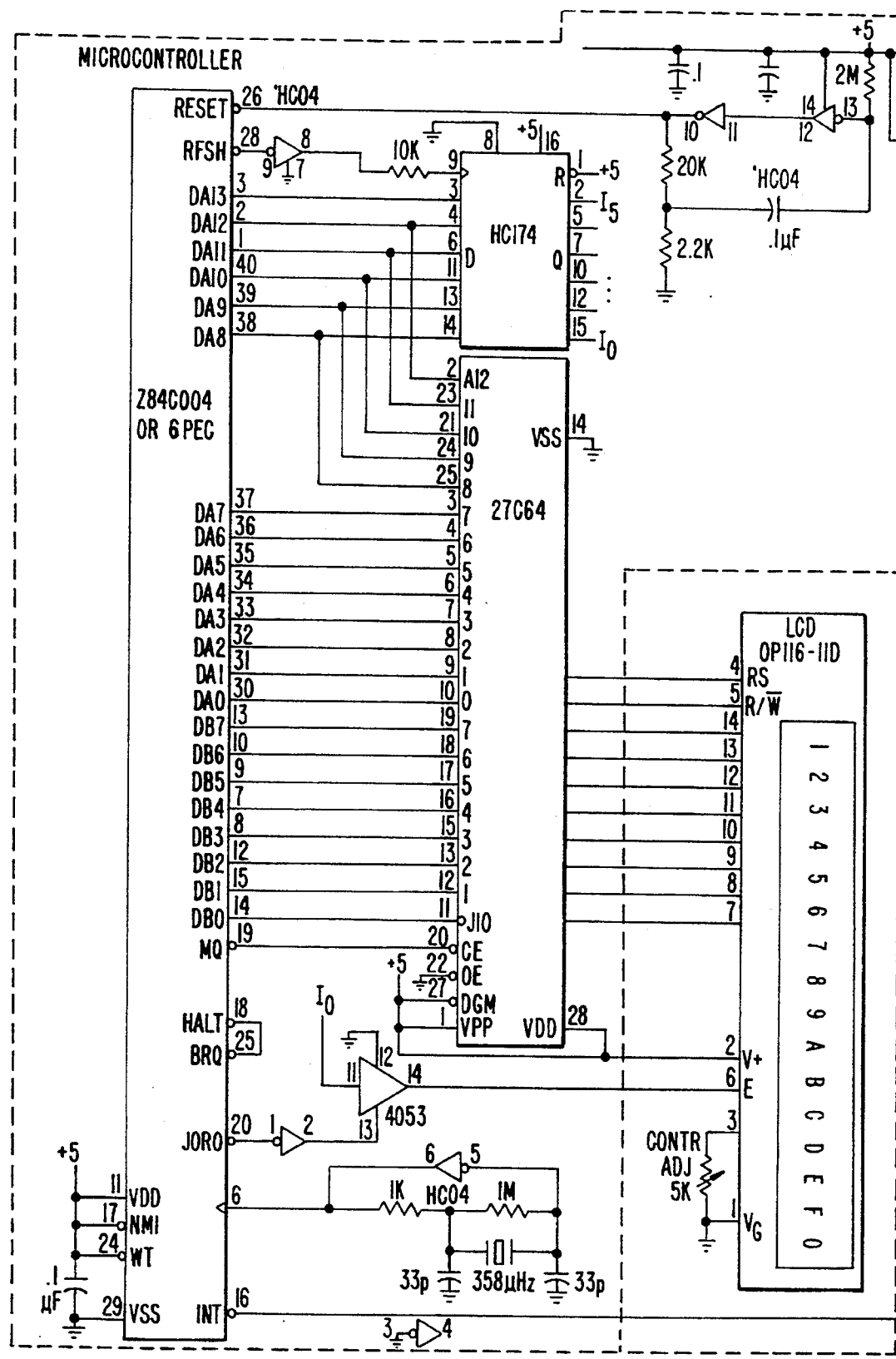
FIGS. 3, 3A and 3B are detailed schematic of the preferred embodiment of the invention.
Figures 3, 3B:
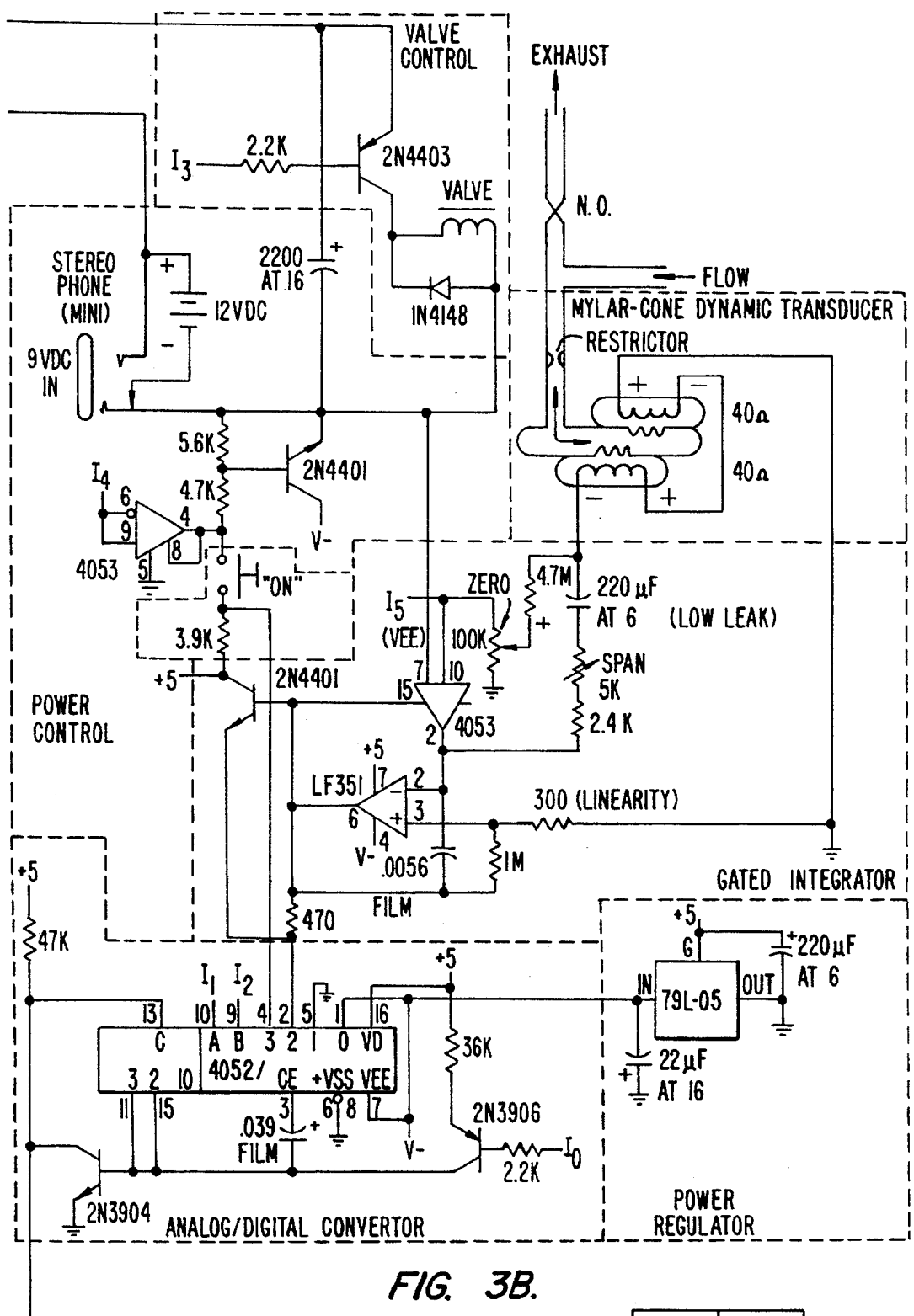

Power regulation is provided by a power regulator unit 38 shown in detail in FIG. 3.

In operation, the fluid flow to be measured is applied to inlet 11 and normally passes through normally open valve 14 to the outlet 12. Thus, while the valve 14 remains deenergized, the path is unobstructed and the input flow is free to exhaust via outlet 12. When valve 14 is energized in response to the receipt by valve control unit 18 of a valve on active signal, valve 14 diverts fluid flow into the displacement transducer 20 via path 16. The displacement transducer in the preferred embodiment comprise a two mylar-diaphragm acoustic transducers (such as audio earphone elements) mounted in facing relation so that the fluid can be introduced to a chamber bounded by the two diaphragms. The electromagnetic outlet coils of the transducers (shown in FIG. 3) are connected electrically in series so that electrical signals produced by flow-induced diaphragm motion are in phase and constructively sum. However, diaphragm motions due to mechanical vibration and ambient noise produce signals of equal magnitude but opposing polarity and thus, to the production tolerance of the elements, interfere and cancel. This results in a substantial improvement in measurement stability. As a result of fluid diverted into the transducer chamber, the diaphragms are displaced in opposing directions and therefore produce an electrical signal proportional to the rate of accumulation of fluid and, thus, to flow. Since the period of valve closure with consequent fluid flow diversion and diaphragm displacement is so short as to be in the range of acoustic frequencies, and due to the positive displacement nature of the flowmeter, the term acoustic displacement has been created for this invention.

After the valve 14 has been enabled by valve control unit 18 in response to the valve on signal, the valve 14 undergoes a transition from the fully opened state to the fully closed state. The time period during which this takes place is designated T1 in FIG. 2. As the valve 14 closes, the displacement transducer 20 begins to generate the output signal S. The initial portion is a transient portion, and the invention is designed to ignore this transient portion of the signal. For this purpose, another time period T2 is provided during which the output signal S from transducer 20 is ignored. The manner in which the time period T2 is chosen is described below. After the initial portion has elapsed, the integrator unit 25 is enabled at the beginning of period T3 so that the integrator output rises at a rate determined by the magnitude of the displacement transducer signal S. The integrator output signal I is periodically sampled in response to the receipt of the ADC sample signal by analog to digital converter 27. The resulting sample values are supplied to the microcomputer unit 30 for computation in the manner described below. The number of samples n, which are generated at a rate of 1.09 milliseconds in the preferred embodiment, is not fixed but is determined in the manner described below. After the last sample has been obtained, the valve 14 is deenergized by the microcomputer 30 and the valve returns to the normally opened position. During this inactive period T0, microcomputer 30 performs other control functions, such as sampling the state of the control switch 32 through the power control unit 29 in order to determine whether or not the switch 32 has been reactivated. In addition, the microcomputer 30 may sample the state of the battery 40 used to power the system to determine whether a low battery condition exists. If so, the low battery condition can be displayed on display unit 35.

One flow sample in the preferred embodiment requires the four phase measurement cycle illustrated in FIG. 2. This cycle is timed by the microcomputer 30 as follows. The first phase, T0, has a fixed duration of approximately 450 milliseconds in the preferred embodiment. In this phase, valve 14 is deenergized, the analog to digital converter 27 is disabled, and the integrator 25 is held reset. Because of this persistent reset of the integrator 25 and of the AC coupling provided by capacitor 23 for the transducer output signal, any DC offset error displayed by the integrator input is nulled to zero during this phase. Because of the open state of the valve 14, any fluid previously accumulated during earlier measurement cycles is allowed to exhaust via outlet 12 and the diaphragms within displacement transducer 20 are permitted to relax to the undisplaced positions.

The second phase of the measurement cycle T1 has a fixed duration of 10 milliseconds in the preferred embodiment. During this phase, power is applied to the solenoid valve 14 via valve control unit 18. Subject to the mechanical delay inherent in the specific valve employed, the application of power to the valve results in closing of the valve and diversion of flow into the inter-diaphragm chamber of the transducers. For the valve used in the preferred embodiment, approximately 7 milliseconds is required for this action to be completed. The additional 3 milliseconds allowed is designed to accommodate uncertainties in valve actuation delay which are apt to result from fluctuations in the power supply and mechanical variations. Closure of valve 14 causes a sizable oscillatory disturbance in the displacement transducer output signal S. At lower flow rates (up to 128 ml per minute in the preferred embodiment), the initial amplitude of this disturbance can be very large compared to the rate of transducer displacement due to measured flow. If this initial amplitude were included in the flow signal acquisition, measurement accuracy could be severely affected. In order to suppress this potential error source, a third phase T2 of the measurement cycle is added by microcomputer 30. The duration of phase T2 is computed by the microcomputer 30 according to the following algorithm:

1. Let f=measured flow in ml/min flow from the preceding measurement cycle (set f=0 if no such flow value is available, as is the case just after power on).
2. If f≧128 ml/min, then T2=0.
3. If f<128 ml/min, then T2=[(128−f)/12.8] milliseconds.

Thus, the duration of T2 decreases from 10 milliseconds to zero as the flow increases from 0 to 128 ml/min. The extra time allowed at low flows for damping of the valve-actuation disturbance provides an important improvement in measurement stability. But at high flows (>128 ml/min), the flow-related signal is so large that possible disturbance-related errors are relatively inconsequential, and a non-zero T2 is unnecessary.

Moreover, a non-zero T2 would actually be harmful to measurement accuracy at high flow rates. This phenomenon results from the finite range of travel available to the transducer diaphragms. The transducers used in the preferred embodiment have a displacement limit for linear measurement of approximately 0.1 ml. If a greater volume than this is allowed to accumulate in the course of a measurement cycle, the mylar diaphragms will be displaced so far from their rest position that the constant relationship between diaphragm motion and transducer output signal amplitude will fail and the flow measurement corrupted. Because the range of accurate flow measurement for the preferred embodiment flowmeter was desired to extend beyond 1000 ml/min=16.7 ml/sec−0.0167 ml/msec, the maximum total flow displacement interval is 6 msec at 1000 ml/min. Because the total flow displacement interval is the sum of:

$$(T1-\text{valve actuation delay})+T2+T3$$

no fixed value for T2 can be compatible with all flow measurement regimes. A fixed value of 10 msec for T2, for example, would "use up" available transducer displacement capacity at a flow of 462 ml/min, even assuming a T3 duration of zero.

The fourth and last phase T3 of the measurement cycle is the phase during which the flow-related signal acquisition actually occurs. The duration of T3 in the preferred embodiment can vary from a low of 2.8 milliseconds to a maximum of 43.6 milliseconds as a function of flow rate. This is due to the method used to convert the analog output of the displacement transducer 20 to a digital reading compatible with microcomputer 30. At the onset of T3, the reset signal is removed from the integrator 25, allowing the output I of the integrator 25 to rise at a rate proportional to the output signal S from the displacement transducer 20. This can be expressed as follows:

$$I = aft$$

where I is the integrator output signal, a is a transducer calibration constant, F is the flow rate, and t is the elapsed time since the enabling of integrator 25. In the preferred embodiment, the analog to digital converter 27 is controlled to periodically sample (at a sample rate of 1.09 millisecond between samples) the output I of integrator 25 during phase T3. The nth sample result can be expressed as:

$$A = bFn$$

where A is the analog to digital sample value, b is the calibration constant for the analog to digital converter 27, F is the fluid flow rate, and n is the sample number relative to the onset of phase T3.

In the preferred embodiment, acquisition of the flow rate signal samples proceeds from the onset of phase T3 according to the following algorithm:

1. Set sum S=0, sample count n=0.
2. Wait 1.09 msec from last sample.
3. Sample integrator 25 output I to 8 bit (fullscale/256) resolution. Set A=ADC result.
4. If A>255 (integrator output signal I has exceeded ADC fullscale), discard sample and go to step 6.
5. Set S=S+A, n=n+1. If n<40 then go to step 2. Because A=bFn, it can be shown that S=bFn (n+1)/2.
6. If n=0, then flow rate exceeds maximum flowmeter is capable of measuring (1024 ml/min in preferred embodiment). Report overflow in readout display 35 and terminate measurement cycle.
7. Set E=flow estimate for this measurement cycle=2S/[bn(n+1)].

The signal acquisition thus implemented displays a number of desirable features. Firstly, a very wide range of flows can be digitized with adequate resolution. In the preferred embodiment, a flow measurement range of 1 to 1024 ml/min with a minimum resolution of 1% of reading was desired. This is equivalent to a 100,000:1 dynamic range. Used alone, the 8 bit resolution ADC 27 has only a 256:1 dynamic range. Indeed, a traditional ADC of 100,000:1 dynamic range would likely be prohibitively expensive for incorporation into a low cost instrument such as the preferred embodiment. The combination of gated integrator 25, low resolution ADC 27, and the algorithm above, however, easily meets the preferred requirement. Analysis of the relationship between flow rate and n, the number of ADC samples that the illustrated algorithm will sum during T3, indicates that measurement resolution varies from a maximum of 1/128 of reading for a flow of 512 ml/min (n=1) to a minimum of 1/8166 of reading at 25.6 ml/min (n=40, n(n+1)/2=820). Resolution remains better than 1% of reading all the way down to 0.125 ml/min, corresponding to a dynamic range of 800,000:1.

Further, relatively high noise immunity to noise-induced errors is enjoyed due to the relatively long integration times (up to 43.6 msec) applied to low flow rates. Also, since the T3 phase of the measurement cycle is terminated and the valve 14 deenergized immediately after completing the signal acquisition algorithm, the flow accumulation interval is kept short (as short as 2.18 msec at F>512 ml/min) at high flows. This prevents exceeding transducer displacement limits at even the highest flows.

Completion of the T3 phase marks the end of a measurement cycle. Flowmeter operation continues with T0 of the next cycle. During T0, in addition to the functions of this phase outlined above, the E value from the most recently completed cycle is summed with the E values from the three preceding cycles to form a two second running average of flow. This sum is then displayed in display unit 35. In addition, during T0 the flowmeter-operator accessible control switch 32 is sampled to permit the entry of a number of commands (e.g., power off), and a check of battery condition is performed so that a warning message can be displayed in the display unit 35 if a state of discharge is imminent.

Battery powered instruments such as the preferred embodiment are commonly provided with an automatic power-off function to prevent operator neglect from resulting in unacceptably short battery life. This function is performed in the preferred embodiment by the power control unit 29. The power on state is initiated by operator actuation of the momentary switch 32. After ten minutes of flowmeter operation, if the switch 32 is not actuated to change the timeout, the microcomputer 30 sends a signal to the power control unit 29 to disconnect battery power and shut off the flowmeter.

Proper operation of various flowmeter elements depends upon regulation of the constant battery voltage to produce a constant voltage source. This function is performed in the preferred embodiment by power regulator 38.

As noted above, displacement transducer 20 comprises a pair of high-compliance acoustic-type displacement type transducers. High diaphragm compliance is exceedingly important to measurement accuracy when measuring compressible fluids, such as most gasses, since only low pressure is required to displace a high-compliance transducer. The exact relationship between diaphragm resiliency and measurement error is dependent upon the dead volume of the source of the flow stream. If a contribution of 1% from this error source to total measurement error is deemed acceptable, and if a maximum flow-source dead volume of 10 ml is assumed, the total diaphragm compliance is 10 ml/0.01=1 liter per atm.

While the above provides a full and complete description of the preferred embodiment of the invention, various modifications, alternate constructions and equivalents may be employed. For example, while specific circuit elements have been described above, other specific elements may be employed, depending on the requirements of a particular application. Therefore, the above description and illustrations should not be construed as limiting the scope of the invention which is defined by the appended claims.

What is claimed is:

1. The method of using a displacement transducer signal representative of flow of a fluid to determine the fluid flow rate, said method comprising the steps of:
   (a) masking an initial portion of the transducer signal for a time period;
   (b) integrating the transducer signal over a measurement period;
   (c) sampling the value of the integrated signal;
   (d) summing the sampled value; and
   (e) determining the fluid flow rate from the equation:

$$F=2S/bn(n+1)$$

where F is the determined flow rate, S is the value of the summed samples, n is the number of samples obtained, and b is a predetermined calibration constant.

2. The method of claim 1 wherein the initial portion time period is determined from a previous determined fluid flow rate.

3. The method of claim 1 wherein the initial portion is determined in accordance with the following algorithm:

if f is $\geq K$, then T=0 if f is <K, then $T=(K-f)/AK$, where f is the fluid flow rate determined according to step (e) from a previous measurement, K is a preselected constant flow rate value lying within the desired range of values to be measured, T is the time value of the initial portion and A is a preselected fraction.

4. The method of claim 3 wherein K is 128 mm per minute and A is 0.10.

5. A device for using a signal representative of fluid flow generated by a transducer to determine the flow rate of a fluid, said device comprising:

input means for receiving said signal;

means for masking an initial portion of the signal received by said input means;

means for integrating the non-masked portion of the signal received by said input means over a measurement period;

means for sampling the value of the integrated signal;

means for summing the sampled values; and means for determining the fluid flow rate from the equation:

$$F=2S/bn(n+1)$$

where F is the determined flow rate, S is the value of the summed samples, n is the number of samples obtained, and b is a predetermined calibration constant.

6. The invention of claim 5 wherein said masking means includes means for determining the length T of the initial signal portion to be masked, using the algorithm:

if $F \geq K$, then T=0 if F<K, then $T=(K-f)/AK$ where F is the fluid flow rate determined from a previous measurement, K is a preselected constant flow rate value lying within the desired range of values to be measured, and A is a preselected fraction.

7. The invention of claim 6 wherein K is 128 mm per minute and A is 0.10.

8. The invention of claim 5 wherein said device further includes manually operable switch means for initiating operation of the device.

9. The invention of claim 8 wherein said device further includes timer means for terminating operation of the device after the lapse of a predetermined time period.

10. The invention of claim 9 wherein said time means includes means for periodically sampling the state of said switch means, and means for extending operation of the device when said sampling means determines that said switch means is activated.

* * * * *